United States Patent [19]
Koike

[11] 3,746,937
[45] July 17, 1973

[54] ELECTROMAGNETIC LINEAR MOTION DEVICE

[76] Inventor: Hiroshi Koike, No. 5-10, 1-chome, Minami-Azabu, Minato-ku, Tokyo, Japan

[22] Filed: July 12, 1971

[21] Appl. No.: 161,706

[52] U.S. Cl. .................................. 318/122, 310/13
[51] Int. Cl. ........................................... H02k 41/02
[58] Field of Search ........................... 310/12–14, 27

[56] References Cited
UNITED STATES PATENTS

| | | | |
|---|---|---|---|
| 3,439,198 | 4/1969 | Lee .................................. | 310/13 |
| 3,505,544 | 4/1970 | Helms .............................. | 310/13 |
| 3,666,977 | 5/1972 | Helms et al. ..................... | 310/13 |
| 3,009,084 | 11/1961 | Balliett ............................ | 310/27 X |
| 3,581,127 | 5/1971 | Warnett ........................... | 310/13 |
| 3,241,006 | 3/1966 | Boyko ............................. | 310/14 X |
| 3,067,404 | 12/1962 | Hildebrandt .................... | 310/27 UX |
| 3,374,409 | 3/1968 | Gorka .............................. | 318/122 |
| 3,260,870 | 7/1966 | Beach, Jr. et al. ............... | 318/135 X |

*Primary Examiner*—D. F. Duggan
*Attorney*—John Lezdey et al.

[57] ABSTRACT

Herein disclosed is an electromagnetic linear motion device having an armature or movable core which is wrapped with a control coil cutting across a magnetic field established through a rectilinear air gap which is defined by inner and outer pole pieces having opposite polarities and positioned in parallel to and at least partly coextensive to each other. The device uses a support mechanism including bearings to longitudinally movably support the movable core and resilient suspension means which is adapted to have the movable core balanced in the longitudinal direction of the device. Such device can be used as a linear motor or a signal generator where minute and precise linear motions are required.

21 Claims, 20 Drawing Figures

Patented July 17, 1973 3,746,937

INVENTOR.
HIROSHI KOIKE
BY John Lindley
ATTORNEY

Patented July 17, 1973 3,746,937

INVENTOR.
HIROSHI KOIKE
BY
*John Lgsley*
ATTORNEY

INVENTOR.
HIROSHI KOIKE
BY John Lezolly
ATTORNEY

INVENTOR.
HIROSHI KOIKE
BY
John Lezolly
ATTORNEY 3,746,937

ELECTROMAGNETIC LINEAR MOTION DEVICE

This invention relates to an electromagnetic linear motion device. The device of the nature herein disclosed may act as a motor in which an electric signal is converted into a corresponding linear mechanical displacement or as a generator in which a linear mechanical displacement is converted into a corresponding electric signal. This invention is thus concerned with a motor-generator in which a linear mechanical movement is utilized as an input or an output depending upon the application.

One of the most simple and fundamental methods of obtaining a linear mechanical displacement proportional to a supplied electric signal is apparently to produce an approximately straight movement with a relatively large radius of curvature and through a limited angle. Typical examples of practical application of such method are oscillographs of various measuring instruments in which a recording pen is moved or oscillated with its tip on a given circular path. Waveforms drawn by this recording pen thus involves a circular distorsion and, therefore, do not lend themselves to precise measurements and analyses for industrial and medical purposes. A useful expedient to solve this problems is to use a hot-stylus oscillograph as practised in the recent field of electrocardiographs. The hot-stylus oscillograph uses a stylus which is heated during operation and a specially processed heat-sensitive recording paper. To enable the recording pen to draw waveforms with perfect linearity, a knife-edge support is positioned underneath the recording paper so as to be in contact with the reverse side thereof at a right angle to the direction of travel of the recording paper. The hot stylus is thus carried by the knife-edge support through the recording paper so that the recording paper is marked with straight lines following the knife-edge support as the hot stylus oscillates and the tip of the hot stylus reciprocates over the knife-edge support.

In order to minimize the sliding friction between the pen and paper and to provide stable and clear-cut waveforms, the knife-edge support should be machined with extreme preciseness during production. To assure accurate and streamlined recording, meticulous and repeated adjustment and maintenance servicing are requisite on the part of the user of the hot-stylus oscillograph. Since, moreover, a considerable amount of electric power is consumed in heating the hot stylus as compared with the power requirement for the feeding of the recording paper, the hot-stylus oscillograph should be powered from a power source of a relatively great capacity, such as from a convenience socket, so that considerable restrictions are placed on carrying the oscillograph from one place to another. All these and the use of the expensive recording paper make the hot-stylus oscillograph costly and cumbersome for commercial production and operation.

A most widely accepted way of converting an electric signal into a corresponding linear or quasi-linear mechanical displacement is to firstly convert the electric signal into a corresponding rotational movement and to secondly convert the rotational movement into the linear, as typically practised in various linear driving devices and translatory servo mechanisms. An equipment operating on this principle generally uses a specially designed circular-to-linear conversion mechanism such as for example a cam arrangement, a combination of belt and pulley or a mechanical linkage. Not only the use of such conversion mechanism makes the whole equipment disproportionately large-sized but, because of the fact that the conversion mechanism is made up of a number of moving parts which are subject to wear and abrasion, the equipment requires periodical replacement of such moving parts during use. Since, moreover, conversion of is subject to considerable sliding friction during movement and is thus unable to quickly and precisely respond to the input signal, and that the support or suspension for the armature is not adapted to hold the armature in a constantly balanced condition when the armature is either at rest or being moved so that a uniform linear movement can not be attained.

It is therefore an object of this invention to provide an improved linear motion device overcoming the above described drawbacks of the prior art linear motion devices.

It is another object of the invention to provide an improved linear motion device which is adapted for use in a variety of industrial and medical control devices and measuring and recording instruments.

It is still another object of the invention to provide an improved linear motion device which is capable of directly converting an electric signal into a linear mechanical displacement without resort to any known circular-to-linear conversion mechanism. The linear motion device herein disclosed thus includes a minimum number of moving parts which are subject to wear and abrasion and is, accordingly, practically free from the necessity of careful inspection and servicing and periodical replacement of parts during use.

It is still another object of this invention to provide an improved electromagnetic linear motion device providing satisfactory response characteristics to the input signal and capable of faithfully following the waveforms of the input signal over a considerably broad frequency band.

It is still another object of the invention to provide an improved electromagnetic linear motion device having pole pieces the rotational movement into the linear is effected in a mechanical fashion, the response characteristics to the input signal is more or less limited and it is difficult to have the waveforms of the input signal faithfully reproduced within a considerably broad frequency band, placing limiltations to practical application especially in the field of industrial and medical instrumentaion. If, as a matter of fact, the equipment using the circular-to-linear conversion mechanism is employed in an oscillograph for the purpose of avoiding the problems inherent in the hot-stylus oscillograph, difficulties now arise in properly adjusting the pressure exerted between the recording pen and the paper and in holding the recording pen in a constantly stabilized condition. The friction between the recording pen and paper thus fluctuates during operation and the frequency characteristics of the circular-to-linear conversion mechanism are unsatisfactory for the precise recording at a high speed.

The problems hereinbefore mentioned are completely solved in linear motors on which serious research and development efforts are presently made in limited quarters of the industry. The linear motor is generally so constructed that an armature of a magnetic material undergoes translatory motion in response to the interaction between the fields of a magnet and a control coil. A stress is usually placed on the significance of the motors of this type as linear motion driving mechanisms, not as elements of control devices or measuring and recording instruments. This is because of the fact that difficulties are generally encountered in positioning the pole pieces compactly and in a manner to utilize the flux at a satisfactory officiency that the distance of stroke of the armature is limited by the inherent construction of the motor, that the armature which are arranged compactly and in a manner to utilize the magnetic field at an increased efficiency.

It is still another object of the invention to provide an improved electromagnetic linear motion device in which an armature or moving core has a stroke of practically unlimited length and is subject to minimized sliding friction during movement.

It is still another object of the invention to provide an improved electromagnetic linear motion device in which the armature or moving core is supported in a satisfactorily balanced condition when the armature or moving core is either at rest or being moved so as to provide a uniform linear displacement as an output.

The linear motion device herein disclosed acts as a motor when reveiving an electric input signal and as a generator when a mechanical displacement is produced as an input signal, as previously noted. If, thus, a current is passed to the armature coil, an electromotive force induced in the coil is converted into a linear mechanical displacement. If, conversely, the armature is moved linearly from the outside of the device, then the displacement is converted into a corresponding electromotive force which is delivered as an electric output signal. It is, therefore, still another object of this invention to provide an improved linear motor-generator.

These and other objects of this invention are attained by an electromagnetic linear motion device comprising magnet means establishing a magnetic field with opposite poles, an inner pole piece connected to one pole of the magnet means, an outer pole piece connected to the other pole of the magnet means and at least partly coextensive with the inner pole piece, the inner and outer pole pieces defining therebetween an elongated or rectilinear air gap through which the magnetic field established by the magnet means passes, a bored movable core or armature movably positioned around the inner pole piece and having at least one coil wrapped therearound so as to cut across the magnetic field, the core being movable through the air gap substantially in parallel to the inner pole piece, and a support mechanism including resilient suspension means suspending the movable core movably in longitudinal directions through the air gap and a plurality of substantially equidistantly spaced bearings partially projecting into the air gap for supporting the movable core in transverse directions of the inner and outer pole pieces. The magnet means forming part of the thus constructed linear motion device may be a permanent magnet or an electromagnet, which is positioned either internally of or in line with the outer pole piece. Where the magnet means is positioned internally of the outer pole piece, the movable core has formed therein a longitudinally elongated bore and the inner pole piece extending from the magnet means projects into this elongated bore. Where, on the other hand, the magnet means is positioned in line with the outer pole piece, the magnet means has a bore through which the inner pole piece extends. The former construction is herein referred to as "core type" and the latter as "shell type," as commonly designated in the field of transformers.

For a clearer understanding of this invention, reference may be made to the accompanying drawings illustrating preferred embodiments of the invention in which like reference numerals indicate similar parts throughout several views and in which.

Figure 1:
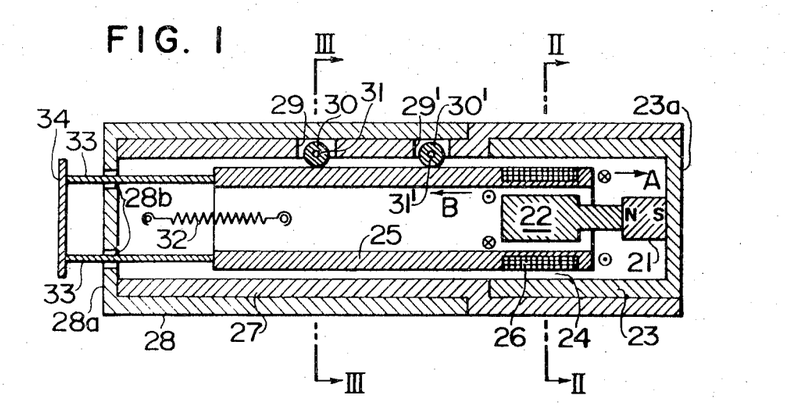
FIG. 1 is a longitudinal sectional view of a preferred embodiment of this invention.
Figure 2:
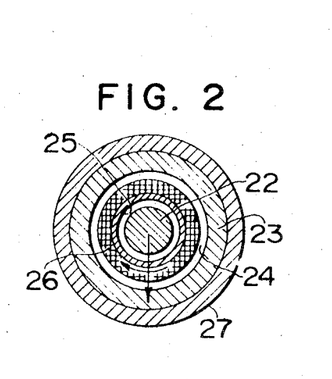
FIGS. 2 and 3 are cross sections on lines II—II and III—III, respectively, of FIG. 1.
Figure 3:
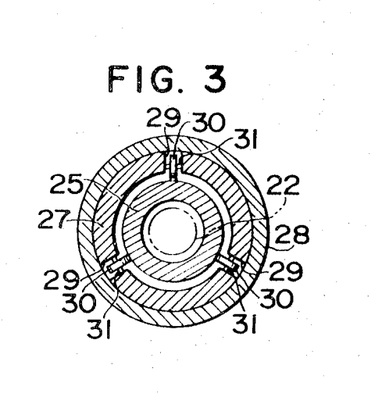

Reference is now made to the drawings, first to FIGS. 1 to 3, in which a first preferred embodiment of the electromagnetic linear motion device according to this invention is shown. The linear motion device as shown has a permanent magnet 21 establishing a magnetic field with opposite poles. An inner pole piece 22 extends from one pole of the magnet 21 while an outer pole piece 23, which is in the form of a cylinder with closed end, is connected to the other pole of the magnet 21 through its closed end wall 23a. The inner and outer pole pieces 22 and 23, respectively, are positioned substatially concentrically with each other and, thus, the outer pole piece 23 has a portion which is coextensive with the inner pole piece 22, as illustrated. The pole pieces 22 and 23 define therebetween a longitudinally elongated annular air gap 24 through which the magnetic field established by the permanent magnet 21 passes in a direction depending upon the polarity of the magnet. A bored cylindrical movable core or armature 25 is movably positioned substantially concentrically with the inner and outer pole pieces 22 and 23, respectively, extending through the air gap 24 substantially in parallel to the inner pole piece 23. A control coil 26 is wrapped around the movable core 25 preferably through an annular groove (not numbered) formed in the outer peripheral wall of the movable core. The movable core 25 is supported by a support mechanism in a manner to be movable in the longitudinal direction through the air gap 24. This support mechanism includes housing means which consists of a generally cylindrical support member 27 attached to the outer pole piece 23 through spigot connection as shown and a cap member 28 having an end wall 28a to close the housing member. The support member 27 has formed therein a plurality of equidistantly spaced slots 29 and 29' in which bearings 30 and 30' are received. The bearings 30 and 30' are journalled to the support member 27 through shafts 31 and 31', respectively, and are held in rolling contact with the movably core 25. The support mechanism for the core 25 further includes resilient suspension means which is herein shown as a coil spring 32. The coil spring 32 is secured at one end to the support member 27 at a close proximity to the end wall 28a of the cap member 28 and at the other end to the inner peripheral wall of the bored movable core 25 and holds the movable core in a neutral position when held under no-load condition.

To carry the movement of the movable core to an external driven member or to carry the movement of an external driving member to the movable core, a suitable number of connecting rods 33 extend from one end of the movable core and project outwardly through apertures 28b formed in the end wall 28a of the cap member 28. The connecting rods 33 are connected to the external driven or driving member through an end plate 34 attached to the ends thereof.

The control coil 26 wrapped around the movable core 25 is connected to an external electric circuit in any desired manner so that an electric input signal is applied thereto from such circuit or an output signal produced therein is delivered to the circuit. For this purpose, a rotary brush (not shown) may be mounted on the support member 27 so that the coil 26 is in sliding contact with such brush as the movable core 25 moves back and forth within the support member, by way of example.

The bearings 30 and 30' are herein shown as roller bearings by way of example but any other bearings of point contact type, such as ball bearings, may be utilized if preferred.

If, now, the permanent magnet 21 of the above described linear motion device has a permanent inner N and an outer S polarity as indicated in FIG. 1, then the inner pole piece 22 will have an N polarity and the outer pole piece 23 will have an S polarity, thereby establishing a magnetic field passing radially outwardly through the air gap 24 as best seen in FIG. 3. When the control coil 26 is energized and a current flows therein in the direction indicated on the right side of the coil in FIG. 1, namely, clockwise as indicated in FIG. 2, the control coil cutting across the magnetic field in the air gap 24 undergoes a force in the direction of arrow A in FIG. 1. The movable core 25 is thus moved toward the closed end wall 23a of the outer pole piece 23 against the action of the coil spring 32 through a distance which is related to the magnitude of the current applied to the coil. If the control coil 26 is de-energized in this condition, the movable core 25 will be returned to its neutral position by the action of the coil spring 32. If, conversely, the control coil 26 is energized with a current flowing in the direction indicated on the left side of the coil in FIG. 1, namely, counterclockwise as indicated in FIG. 2, the coil is subjected to a force in the direction of arrow B in FIG. 1 so that the movable core 25 is moved toward the end wall 28a of the cap member 28 against the action of the coil spring 32. The movable core 25 is in this manner moved back and forth through the air gap depending upon the direction of the current in the control coil 26 and through a distance which is dictated by the magnitude of the input signal. The displacement of the movable core 25 is transmitted through the connecting rods 33 to an external driven member which may be a recording pen of an oscillograph. The device of FIGS. 1 to 3 thus acts as a motor.

The movable core 25 may be driven from an external driving member through the connecting rods 33 where it is desired that the device shown in FIGS. 1 to 3 is used as a signal generator. In this instance, the electromotive force induced in the control coil 26 varies in proportion to the amount of displacement of the movable core 25 so that an electric output signal proportional to the supplied mechanical input signal is delivered to the electric circuit connected to the coil 26.

Figure 4:
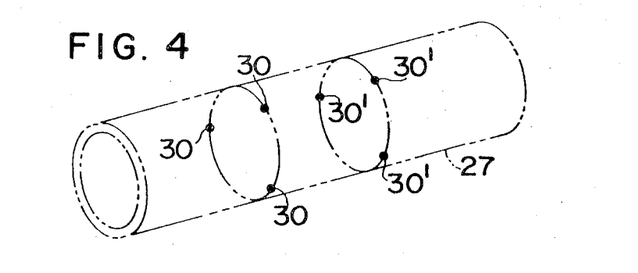
FIGS. 4 and 5 are views indicating examples of the arrangement of bearings to be incorporated in the embodiment shown in FIGS. 1 to 3.
Figure 5:
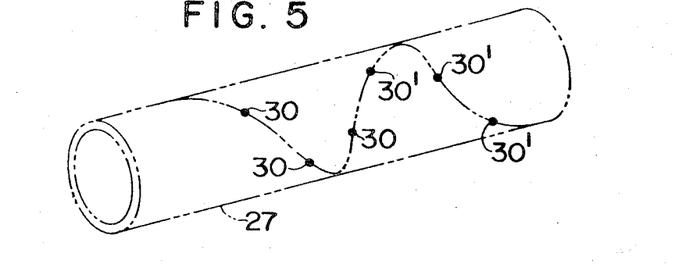

The fore-and-aft movements of the movable core 25 are streamlined through provision of the point-contact bearings 30 and 30' by which the movable core is supported. These bearings 30 and 30' may be provided in any desired number and located in any desired manner insofar as the movable core 25 is thereby supported in a balanced and stable condition. For instance, the bearings may be located in such a manner that they are substantially equidistantly spaced from each other circumferentially of the outer peripheral wall of the movable core as seen in FIG. 4. Or otherwise, the bearings may be located at substantially equidistantly spaced points on a spiral curve described around the movable core as indicated in FIG. 5.

Figure 6:
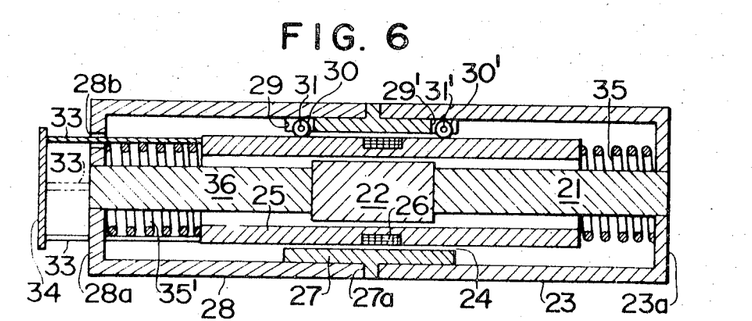
FIGS. 6 to 8 are similar to FIG. 1 but show other preferred embodiments of this invention.

A second preferred embodiment of the linear motion device according to this invention is now illustrated in FIG. 6. The device herein shown in essentially similar in construction to the device shown in FIGS. 1 to 3 and, as such, comprises similar parts which are designated by like reference numerals. As illustrated in FIG. 6, the inner pole piece 22 is relatively elongated to be in the form of a stem thereby to provide a prolonged air gap 24. The coil 26 is wrapped around a substantially central portion of the movable core 25 while the slots 29 and 29' to receive the bearings 30 and 30' therein are formed at both ends of the support member 27, whereby the coil 26 moves back and forth between the two sets of the bearings 30 and 30' during operation. The movable core 25 is suspended between the end walls 23a and 28a by means of a pair of substantially identical coil springs 35 and 35'. One spring 35 is seated at one end on the end wall 23a of the outer pole piece 23 and at the other end on that end of the movable core 25 facing the end wall 23a, and the other spring 35' is seated at one end on the end wall 28a of the cap member 28 and at the other on the that end of the movable core facing the end wall 28a. The outer pole piece 23 and the cap member 28 are held in alignment with each other by means of an annular rib 27a formed on the outer peripheral wall of the support member 27. Designated by 36 is an inner support member extending from the end wall 28a whereby the inner pole piece 22 is supported at its leading end.

The linear motion device illustrated in FIG. 6 is adapted to provide uniform distribution of the flux density and balanced strokes of the movable core in both directions. Since, moreover, the movable core 25 is suspended by the two substantially identical springs 35 and 35' positioned on both sides thereof, the balanced movements of the core 25 can be attained substantially irrespective of the relative position of the device as a whole.

Figure 7:
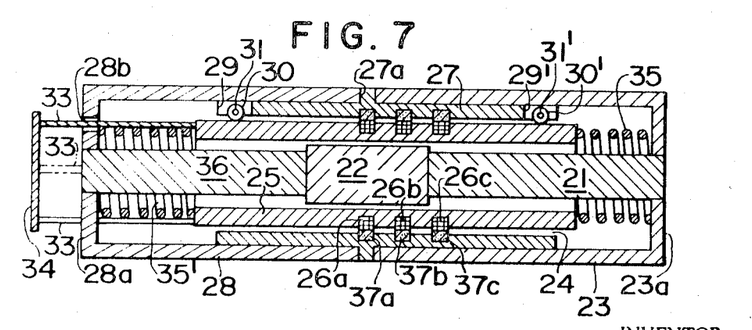

FIG. 7 illustrates a modified form of the device shown in FIG. 6, in which the movable core 25 has a plurality of control coils wrapped therearound. The control coils, which are herein shown as three in number as indicated by 26a, 26b and 26c by way of example, may have equal or different turns of winding and are associated with respective rotary brushes 37a, 37b and 37c which are embedded in the inner peripheral wall of the support member 27. The brushes 37a, 37b and 37c are thus in rolling contact with the associated control coils 26a, 26b and 26c, respectively, and are connected to an external electric circuit. When, in operation, a current of a relatively small magnitude is supplied from the external electric circuit, only the control coil 26a is energized through the brush 37a so as to move the core 25 over a distance which is proportional to the magnitude of the current supplied. When, furthermore, a current of a greater magnitude is supplied from the external electric circuit, then the control coils 26a and 26b are energized through the respective brushes 37a and 37b so that the movable core 25 is now permitted to move over an increased distance. The device illustrated in FIG. 7 is thus adapted to have available strokes of different or adjustable ranges where such device is used as a linear motor. Where it is desired that the device of FIG. 7 be utilized as a linear motion signal generator with the movable core 25 driven from an external driving source, then electric signals of different magnitudes will be produced by the control coils with equal or different turns of winding depending upon the distance of stroke of the movable core. The device herein shown may find other useful applications. If, for instance, one of the control coils is used as a primary coil which is connected to an external electric source and the remaining coil or coils are used as secondary coils, with equal or different turns of winding, then an electromotive force or forces will be induced in the secondary coils when the primary coil is energized and the movable core is accordingly moved through the air gap. Electric signals with identical or different waveforms are thus delivered from the secondary coil or coils.

It is apparent that the number of turns of each of the coils and the number of the coils per se can be selected as desired depending upon the operation requirements.

Figures 8, 9, 11, 12:
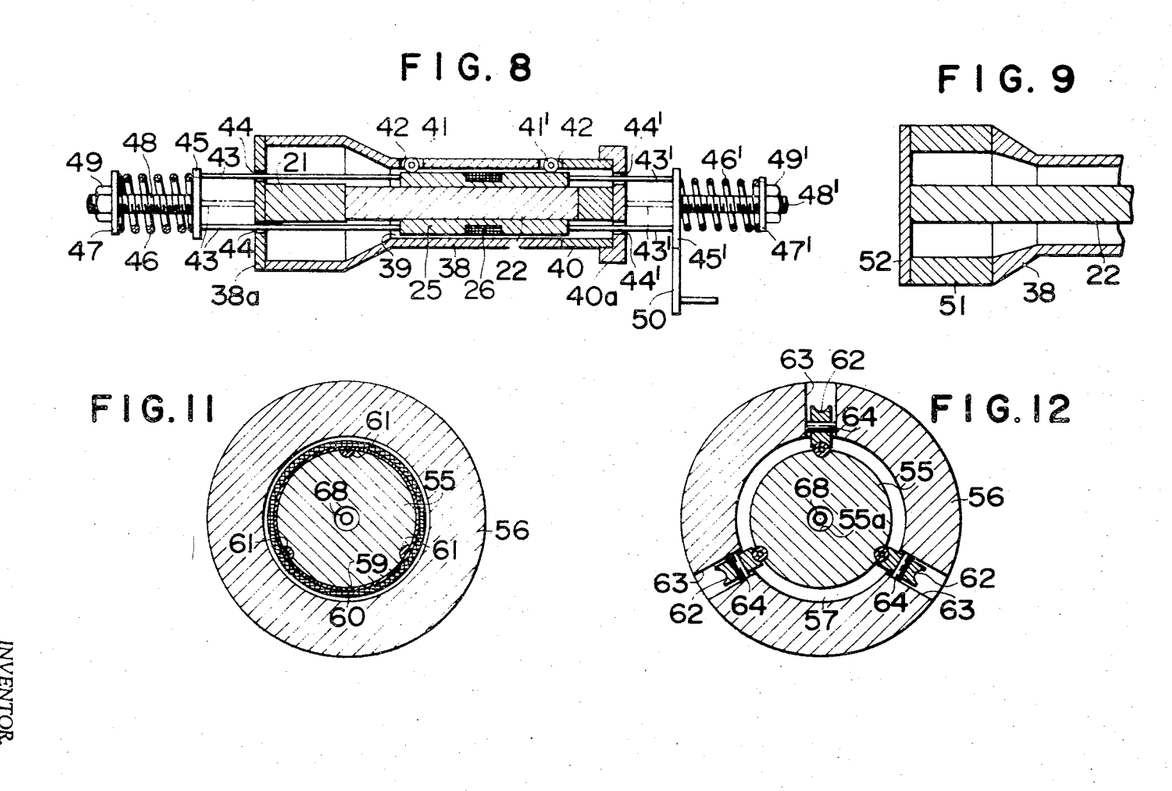
FIG. 9 is a fragmentary longitudinal sectional view showing a modification applicable to the embodiments previously shown.
FIGS. 11 and 12 are cross sections taken on lines XI—XI and XII—XII, respectively, of FIG. 10.

FIG. 8 illustrates a fourth preferred embodiment of the linear motion device according to this invention. The device as shown includes a permanent magnet 21 and an inner pole piece 22 extending from one pole of the magnet 21, similarly to the embodiments previously described. A generally cylindrical outer pole piece, which is now denoted by reference numeral 38, is connected to the other pole of the magnet 21 through a closed end wall 38a thereof. This outer pole piece 38 is coextensive partly with the magnet 21 and partly with the inner pole piece 22 whereby an annular elongated air gap 39 is defined between the coextensive portions of the inner and outer pole pieces 22 and 38, respectively. In order that the magnetic field passing through the air gap be utilized at a satisfactory efficiency, that portion of the outer pole piece 38 which is coextensive with the inner pole piece 22 may be reduced so as to minimize the air gap 39, as illustrated. A tubular movable core 25 is positioned within the outer pole piece 38 in a manner that the inner pole piece 22 extends therethrough and that the core 25 is movable through the air gap 39. The movable core 25 has wrapped therearound a control coil 26 which is associated with a rotary brush (not shown), similarly to the embodiment shown in FIG. 6. The outer pole piece 38 is closed at its leading end by a cap member 40 which is aligned therewith.

The movable core 25 and the coil 26 are longitudinally movably supported by a support mechanism which includes two sets of bearings 41 and 41' rotatably received in respective slots 41 and 41' which are circumferentially equidistantly formed in the outer pole piece in a manner as to permit the control coil 25 to be movable therebetween as the movable core 25 is moved back and forth through the air gap 39. The bearings 41 and 41' are held in position by shafts (not numbered) which are mounted in the slots 42 and 42', respectively. The support mechanism for the movable core 25 further includes resilient suspension means by which the movable core is suspended longitudinally movably in both directions. The resilient suspension means includes two substantially identical sets of connecting rods 43 and 43' extending from both ends of the movable core 25 and projecting outwardly through apertures 44 and 44' which are formed in the end walls 38a and 40a of the outer pole piece 38 and the cap member 40, respectively. The connecting rods 43 and 43' are connected at their opposite ends to end plates 45 and 45', respectively, and a pair of substantially identical coil springs 46 and 46' press upon these end plates axially inwardly. The coil springs 46 and 46' are seated each at one end on outer faces of the end plates 45 and 45' and at the other on a pair of suitable stationary members 47 and 47', respectively, serving as spring supports. To maintain the two springs 46 and 46' in an equally prestressed condition, adjusting means comprising bolts 48 and 48' and nuts 49 and 49' may be mounted on the stationary members 47 and 47', respectively.

The rotary brush which has been described as associated with the control coil 26 may be dispensed with in the device of the nature shown in FIG. 7. In this instance, the connecting rods 43 and 43' and the associated coil springs 46 and 46' are made of an electrically conductive material and are respectively connected to the control coil 26 and to an external electric circuit. This will permit further reduction of the air gap, provide ease of assembling of the device, and eliminate wear of the rotary brush during use.

To carry the movement of the movable core to an external driven member or to have the movable core driven by an external driving member, an actuating rod 50 may be attached to the end plate 45' although the same purpose can be accomplished in any desired manner.

Since, in the device shown in FIG. 8, the springs 46 and 46' are mounted externally of the outer pole piece 38, there is practically no limitation placed on the length of the device as a whole. The device of FIG. 8 is thus useful especially where strokes over increased distances are required of the movable core.

The linear motion devices hereinbefore described are all of the core type which is previously defined, each having a permanent magnet which is in the form of a slug or stem and which is mounted internally of the outer pole piece. These devices, however, can be readily modified to the shell type previously defined, in which a permanent magnet in a ring form or at least having an axial bore is connected either directly or indirectly to the inner and outer pole pieces, an example of such modified devices being partially shown in FIG. 9.

As seen in FIG. 9, a permanent magnet 51 which is in a ring form is connected at one end thereof to the inner pole piece 22 through a yoke or end wall member 52 of a magnetizable material and at the other end to the outer pole piece which is designated by numeral 38 as in the case of the device shown in FIG. 8. The device of the shell type thus constructed is advantageous because a magnet of any large size can be used so as to establish a powerful magnetic field with which the movable core is moved with an increased thrust.

Figure 10:
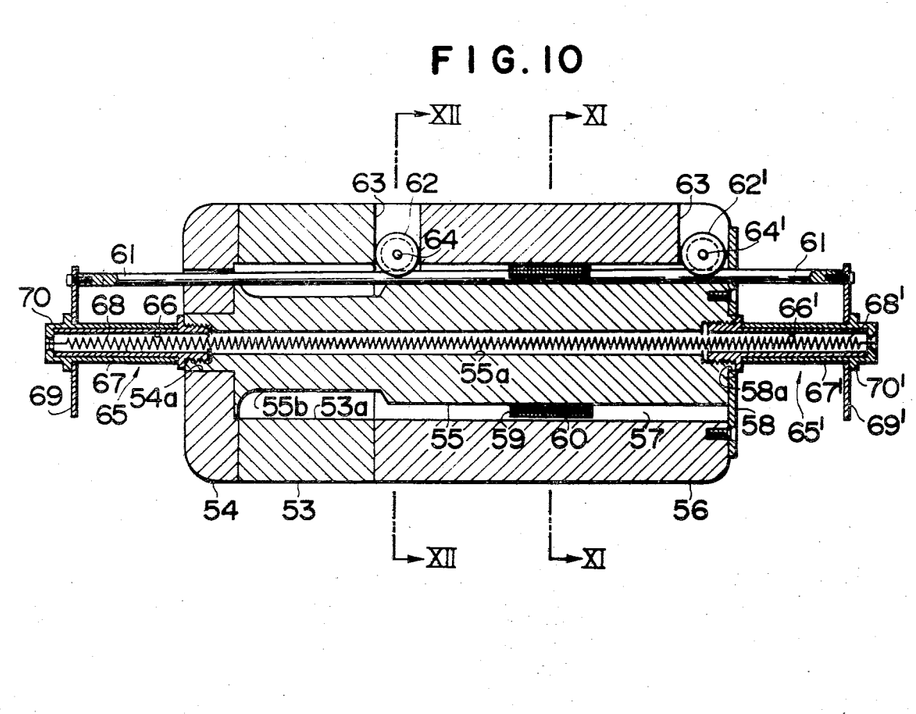
FIG. 10 is a longitudinal sectional view of still another preferred embodiment of this invention.

A further preferred form of the linear motion device according to this invention is now illustrated in FIGS. 10 to 13. The device as shown is of the shell type construction and has a permanent magnet which is now designated by reference numeral 53. The magnet 53, which is in a ring form, has an axial bore 53a and is supported by a yoke or end wall member 54 of a magnetizable material. This end wall member 54 has a central aperture 54 through which the inner pole piece 55 is secured to the end wall member or yoke 54. Thus, the inner pole piece 55 is of similar polarity to the pole of the magnet 53 to which the end wall member 54 is attached. The inner pole piece 55 has formed therein an axial bore 55a extending throughout the length of the pole piece and a reduced portion 55b which is coextensive with the magnet 53, as illustrated. A cylindrical outer pole piece 56 extends from the other pole of the magnet 53 coextensively with the enlarged portion (not numbered) of the inner pole piece 55, thus defining an annular elongated air gap 57 between the inner and outer pole pieces 55 and 56, respectively. The magnet 53 and the outer pole piece 56 are thus held in concentrical alignment with the inner pole piece 55 which is coextensively surrounded by the former two. Designated by reference numeral 58 in FIG. 10 is an end plate of a non-magnetic material which is attached to the ends of the inner and outer pole pieces 55 and 56, respectively to hold them in place.

Figure 13:
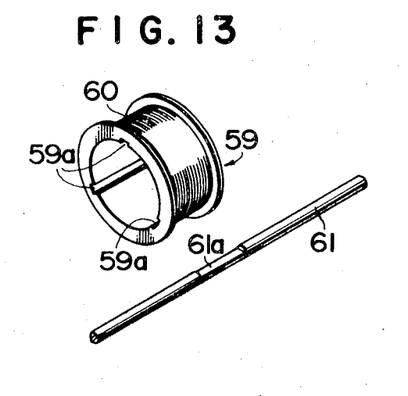
FIG. 13 is a perspective view showing an arrangement of a movable core and part of its support mechanism of the embodiment shown in FIGS. 10 to 12.

A bored movable core 59 with a control coil 60 wrapped therearound is positioned around or at a substantial spacing from the inner pole piece 55 in a manner that the control coil 60 cuts across the magnetic field passing radially through the air gap 57. The core 59 is longitudinally movably supported by a suppot mechanism including a plurality of bored guiding rods 61 and a plurality of bearings 62 and 62'. The bored guiding rods 61, which commonly have a length appropriately greater than the overall length of the inner pole piece 55 as seen in FIG. 1, extend throughout the air gap 57 and project outwardly in opposite directions through apertures 54b formed in the end wall member 54 and apertures 58a formed in the end plate 58. The guiding rods 61 are secured to the movable core 59 through grooves 59a formed in an inner peripheral wall of the movable core in the direction substantially parallel to an axis of the core, as seen in FIG. 13. Each of the guiding rods 61 thus supporting the movable core thereon has formed therein an longitudinal slot 61a which is substantially coextensive with the movable core, for the reason to be discussed later. The guiding rods 60 are preferably substantially equidistantly spaced from each other so as to support the movable core in a balanced condition, as seen in FIGS. 11 and 12. The bearings 62 and 62' forming part of the support mechanism, on the other hand, are rollers which have circumferential grooves and which are received in respective slots 63 and 63' formed in end portions of the outer pole piece 56. These grooved bearings or rollers 62 and 62' are rotatably mounted on shafts 64 and 64', respectively, which are held in place across the slots 63 and 63', as seen in FIGS. 10 and 12. The bearings 62 and 62' slightly project into the elongated air gap 57 and are held in rolling contact with the guiding rods 61, which are consequently permitted to move back and forth through the air gap 57 together with the core 59 carrying the coil 60.

The support mechanism for the movable core 59 further includes resilient suspension means by which the movable core is longitudinally movably suspended in the air gap 57 in a balanced condition. This resilient suspension means comprises a pair of telescopic or extendible end plugs 65 and 65' which are attached to both ends of the inner pole piece 55 in a manner to close the axial bore 55a in the inner pole piece. These telescopic end plugs 65 and 65' are made up respectively of open-ended inner tubular members 66 and 66' connected to or screwed into opposite end walls of the inner pole piece 55 and outer tubular members 67 and 67' with closed outer ends. These outer tubular members 67 and 67' longitudinally slidably receive therein the inner tubular members 66 and 66'. A tension spring 68 is stretched between opposite end walls of the two outer tubular members 67 and 67' and extends through the axial bore 55a in the inner pole piece 55 whereby the outer tubular members 67 and 67' are biased toward each other, namely, the two telescopic end plugs 65 and 65' are normally held in contracted conditions which are shown in FIG. 10.

The telescopic or extendible end plugs 65 and 65' are operatively associated with the bored guiding rods 61 through respective guiding arms 69 and 69'. These guiding arms 69 and 69' are connected each at one end to opposite ends of the guiding rods 61 and have formed each at the other end apertures (not numbered) in which the outer tubular members 67 and 67', respectively, are slidably received. The outer tubular members 67 and 67' have formed at their outer end portions respective abutments or annular flanges 70 and 70' which are usually located to be in abutting engagement with the guiding arms 69 and 69', respectively, when the movable core 59 and accordingly the guiding rods 61 are held at rest or in neutral conditions and consequently the telescopic or extendible end plugs 65 and 65' are in their contracted conditions, as shown in FIG. 10.

The control coil 60 of the movable core 59 has its ends connected to an external electric circuit through conductors (not identified) passed through one or more of the bored guiding rods 61. Thus, the bored guiding rods used in the device herein shown may be said to be conduits for the conductors. One or both of the guiding arms 69 and 69' are mechanically connected to an external driven or driving member, thereby to carry the movement of the movable core to the driven member or to carry the movement of the driving member to the movable core, as the case may be.

When, in operation, the control coil 60 of the movable core 59 is energized with a current supplied from the external electric circuit, then the movable core is moved in a direction depending upon the direction of the current in the control coil. If, now, it is assumed that the movable core 59 is moved away from the end wall member 54, namely, rightwardly in the drawing, the bored guiding rods 61 and the guiding arms 69 are moved in the same direction, causing the outer tubular member 67' to move away from the end plate 58 with its annular flange 70' held in abutting engagement with the guiding arm 69. While this occurs, the guiding arm 69 leaves the annular flange 70 of the outer tubular member 67 which is held in situ in this condition. The movement of the movable core 59, which is related to the magnitude of the current applied to the coil 60, is in this manner transmitted to the external driven member, the shown device thus acting as a motor. The operation of the device used as a generator is essentially reverse to the above described operation and, therefore, will be self-explanatory.

The main advantages of the device above described are that the movable core can be suspended in a satisfactorily balanced condition in both directions because it is carried by light-weight bored guiding rods and only one spring and that the spring can act uniformly and stably even when it is in a stretched condition because practically no limitation is placed on the length of the spring.

Figure 14:
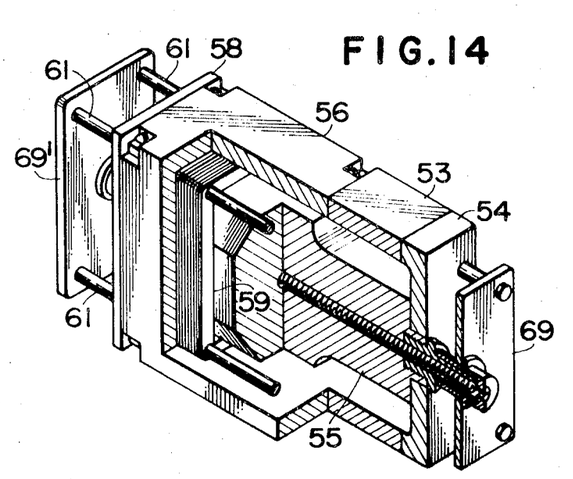
FIG. 14 is a partially cut-away perspective view of a modification of the embodiment shown in FIGS. 10 to 12.

Although the devices which have heretofore been described are shown as circular in cross section, they may have any desired cross section. FIG. 14 shows a modification of the device shown in FIGS. 10 to 13, in which the magnet 53, end wall member 54, inner and outer pole pieces 55 and 56, end plate 58 and movable core 59 are all configurated to have generally rectangular cross sections. The movable core 59 is shown as supported by four bored guiding rods 61 which are generally symmetrically disposed.

Figure 15:
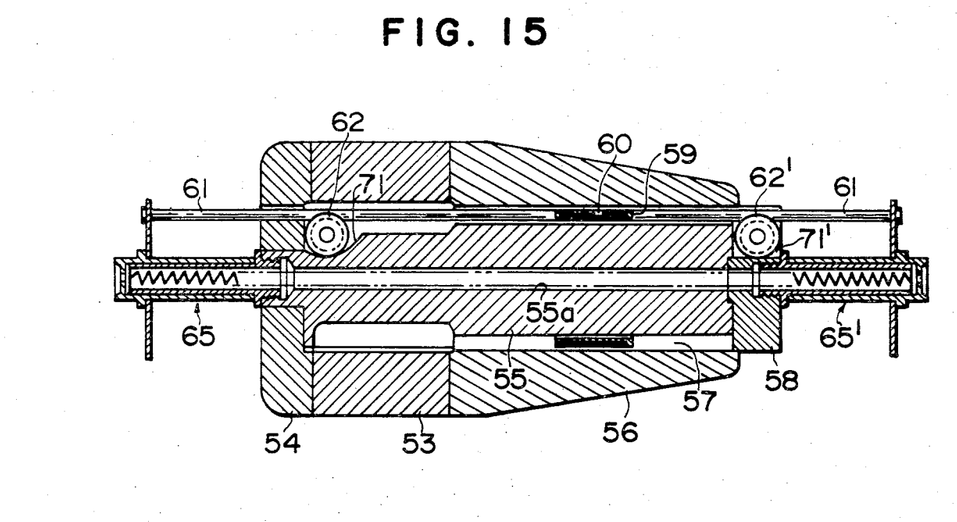
FIG. 15 is a longitudinal sectional view illustrating still another embodiment of this invention.

FIG. 15 illustrates another modification of the device shown in FIGS. 10 to 13, in which the bearings or grooved rollers 62 and 62' to support the movable core 59 thereon are received in slots 71 and 71' which are formed in the inner pole piece 55 and the end plate 58 which, for this purpose, may be appropriately thickened as illustrated. The device shown in FIG. 15 is entirely similar to the device of FIGS. 10 to 13 in other respects and the discussion given on the latter applies to the former as it exactly is.

The device shown in FIG. 14 mainly features the ease of installation in working positions while the device of FIG. 15 features the ease of assembling during production.

Figure 16:
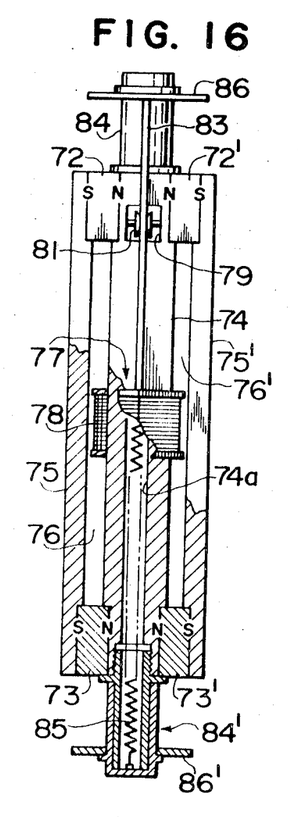
FIG. 16 is a top plan view, partially cut away, of still another embodiment of this invention.
Figure 17:
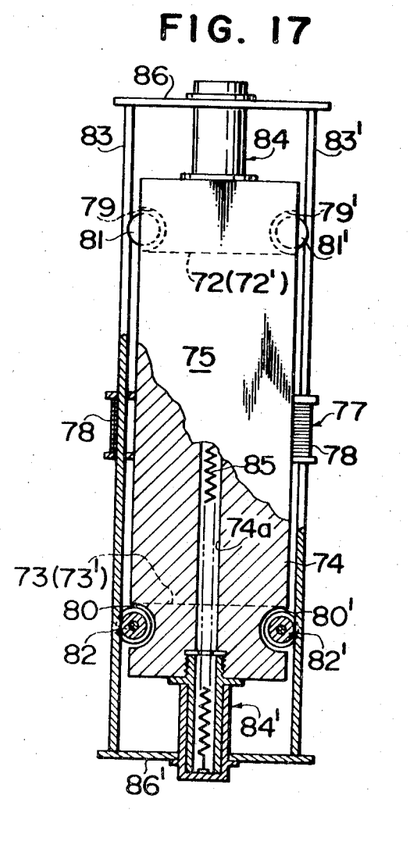
FIG. 17 is a side elevational view, partially cut away, of the embodiment shown in FIG. 16.

FIGS. 16 and 17 now illustrate a further modified form of the linear motion device according to this invention, the modified device being specifically adapted for production on a commercial basis because of its compact construction, ease of assembling and installation and production economy.

Referring to FIGS. 16 and 17, the device shown includes a first pair of spaced permanent magnet elements 72 and 72' and a second pair of spaced permanent magnet elements 73 and 73'. All these permanent magnet elements are substantially identical to each other and are shaped as rectangular parallelpiped. An inner pole piece 74 is sandwiched at one end portion by the magnet elements 72 and 72' and at the other by the magnet elements 73 and 73', as seen in FIG. 16. A pair of outer pole pieces 75 and 75' are attached at one end portion to outer faces of the magnets 72 and 72' and at the other end portion to outer faces of the magnet elements 73 and 73'. All the magnet elements 72, 72', 73 and 73' have one pole at their inner faces and the opposite pole at their outer faces. Thus, the inner pole piece 74 is of similar polarity to the pole of the magnet elements with which it is in contact while the outer pole pieces 75 and 75' are of similar polarity to the pole of the magnet elements with which they are held in contact. If, therefore, each of the magnet elements has an inner N and an outer S polarity as indicated in FIG. 16, then the inner pole piece 74 will have an N polarity while the outer pole pieces 75 and 75' will have an S polarity. The inner pole piece 74 and the outer pole pieces 75 thus define spaced parallel elongated air gaps 76 and 76' which are defined between facing sides of the inner and outer pole pieces and through which a magnetic field passing from the inner pole piece to the juxtaposed outer pole pieces is established.

The inner pole piece 74 is surrounded by a movable core 77 with a coil 78 wrapped therearound. The core 77 is movable through the air gaps 76 and 76' and the coil 78 thereon cuts across the magnetic field obtaining between the air gaps.

The movable core 77 is so configurated as to have a generally hexagonal cross section though not seen in FIGS. 16 and 17 and is longitudinally movably supported by a support mechanism which per se is essentially similar to its counterpart in the device shown in FIGS. 10 to 13. Thus, the inner pole piece 74 has formed in its top and bottom walls holes or recesses 79 and 79' which are adjacent one lengthwise end of the inner pole piece and holes or recesses 80 and 80' which are adjacent the other lengthwise end of the inner pole piece, as seen in FIG. 17. Bearings 81 and 81' are received in the opposed holes 79 and 79' and bearings 82 and 82' are received in the opposed holes 80 and 80', respectively. These bearings are actually grooved rollers which are rotatably supported by the inner pole piece through shafts (not shown) mounted thereon. A pair of guiding rods 83 and 83' are longitudinally movably supported by the grooved rollers, one by the rollers 81 and 82 and the other by the rollers 81' and 82'. These guiding rods 83 and 83' are commonly of a length which is appropriately greater the overall length of the inner pole piece and are preferably bored so as to reduce the weights thereof. The guiding rods 82 and 82' are attached to the movable core 77 in a manner discussed with reference to FIG. 13 whereby the core 77 is movable in both directions alongside the inner pole piece 74.

The inner pole piece 74 has formed therein an axial bore 74a extending from one end of the inner pole piece to the other and a pair of telescopic or extendible end plugs 84 and 84' are connected to lengthwise end walls of the inner pole piece 74. These end plugs 84 and 84' are constructed and arranged entirely similarly to the end plugs 65 and 65' of the device shown in FIG. 10 and are normally held in contracted conditions by means of a tension spring 85 extending between end walls of these end plugs through the axial bore 74a in the inner pole piece 74. The end plugs 84 and 84' are connected to opposite ends of the guiding rods 83 and 83' through respective guiding plates 86 and 86' through which the end plugs are slidable in a manner previously described.

The foregoing description has been solely directed to devices in which a magnetic field is built up by a permanent magnet but it is apparent that the magnetic field can be produced by the use of one or more magnetizing coils which are excited from an external a.c. or d.c. power source. It is, in this instance, important that the control coil of the movable core be wound in a manner to be in phase with the magnetizing coil or coils. An example of the devices of this character is illustrated in FIG. 18.

Figure 18:
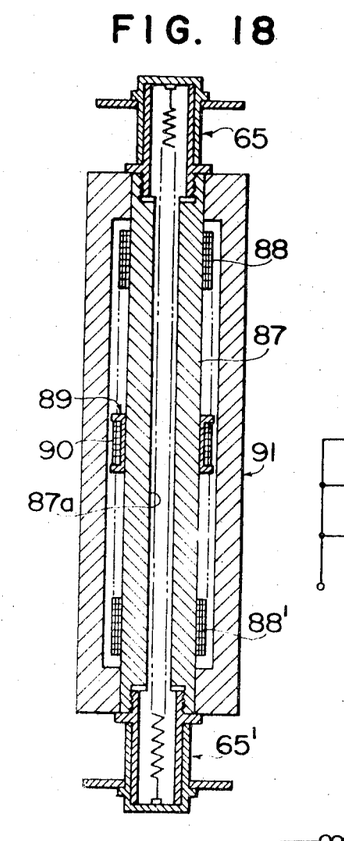
FIG. 18 is a longitudinal sectional view of still another embodiment of this invention.

Referring to FIG. 18, the device includes an inner pole piece or elongated stationary core 87 of a magnetizable material. Magnetizing coils 88 and 88' are wrapped around end portions of this inner pole piece or stationary core 87 and a movable core 89 with a control coil 90 wrapped therearound is longitudinally slidably mounted around an intermediate portion of the stationary core, as illustrated. The magnetizing coils 88 and 88' and the control coils 90 are connected in series with each other in a manner to permit the core 89 to move back and forth along the stationary core 87. The control coil 90 is thus connected to the magnetizing coils 88 and 88' through flexible lines or conductors which are arranged to be extendible in the direction of the stationary core, though not shown as such. The stationary core 87 is surrounded by an outer pole piece or magnet-transfer housing 91 which is secured at both ends to the stationary core and which extends coextensively therewith. This outer pole piece or magnet-transfer housing 91 may be in the form of a unitary hollowed structure having formed at both ends apertures to pass therethrough the stationary core 87 whereby a continuous elongated air gap is formed between the stationary core and such hollowed structure. Or otherwise, the magnet-transfer housing 91 may be in the form of a pair of split, generally flat members which are attached to both sides of the stationary core, defining spaced parallel air gaps between the stationary core and such flat members.

The movable core 89 is supported by a support mechanism which is entirely similar to the support mechanism of the device shown in FIGS. 10 to 13 or in FIGS. 16 and 17. Thus, the stationary core 87 has an axial bore 87a extending throughout its length and closed at both ends by a pair of telescopic end plugs 65 and 65'. These end plugs are operatively connected to guiding rods (not herein shown) on which the movable core is supported, in a manner previously discussed.

The magnetizing coils 88 and 88' and the control coil 90 are wound in a common direction so that they are in phase with each other. These coils should be so arranged that the magnetizing coils 88 and 88' act as current coils while the control coil 90 acts as a voltage coil responsive to the voltage applied thereto.

Figure 19:
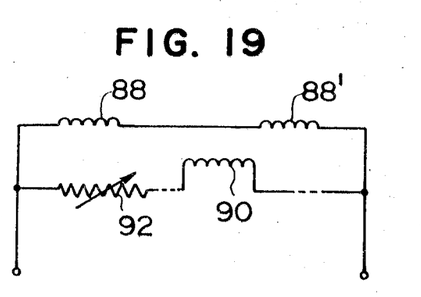
FIGS. 19 and 20 are schematic views showing modified electric connection arrangements applicable to the embodiment shown in FIG. 18.
Figure 20:
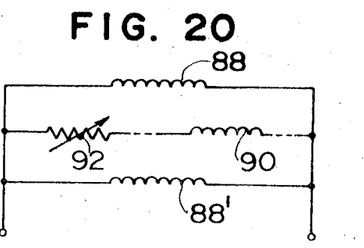

The magnetizing coils 88 and 88' may be connected in parallel to the control coil 90 if desired, as illustrated in FIG. 19. Or otherwise, all the coils may be connected in parallel to each other as illustrated in FIG. 20, depending upon the operaton requirements. In order that the range of the strokes of the movable core be adjustable during operation, a rheostat 92 may be connected in series with the control coil 90, as seen in FIGS. 19 and 20.

While various embodiments of the linear motion device according to this invention have heretofore been described in detail, such are solely for the purpose of illustration and, therefore, changes and modifications may be incorporated on a practical basis. The pole pieces forming part of each of the devices herein disclosed may be designed and proportioned, and the air gaps sized, in any desired manner, so as to provide an equal and symmetrical or suitably varying magnetic flux distribution throughout the movement of the movable core, depending upon the application of such devices. An example of such varying magnetic flux distribution may be a logalithmicaly or exponentially varying flux distribution.

The number of turns of the control coil can be varied practically arbitarily because the movable core can be of any desired size. The device according to the invention thus provides ease of impedance matching between the control coil and the external circuit, such as an amplifier, connected thereto. The thrust and velocity of movement of the movable core can be selected to best meet the operation requirements simply varying the number of turns of the control coil.

The device herein disclosed will find a wide variety of practical applications especially in the fields of industrial and medical control and instrumentation. Examples of such applications include industrial robots and manipulators, automatic control devices of machines, motor vehicles and aircrafts, industrial and medical measuring and recording devices, control systems of computors, traversing mechanism of machinery, meteorological observatory instruments, shutters and light adjusting mechanisms of optical appliances and so forth.

I claim:

1. An electromechanical linear motion device comprising magnet means for establishing a magnetic field, an inner pole piece connected to one pole of said magnet means, an outer pole piece connected to the other pole of the magnet means and at least partly coextensive with said inner pole piece, the inner and outer pole pieces defining therebetween an elongated air gap through which said magnetic field passes, a movable core having a bore having at least one control coil wrapped therearound and longitudinally movable in said elongated air gap, said air gap having a length which is substantially greater than a length of strokes of said movable core in both directions, a plurality of guiding rods connected to said movable core and projecting outwardly of said inner and outer pole pieces and substantially in parallel to said air gap and to the direction of strokes of the movable core, a plurality of substantially equidistantly spaced bearings which are in rolling contact with said movable core and which are supported on shafts stationary relative to said inner and outer pole pieces, and spring means extending longitudinally through said movable core for biasing the movable core to a neutral position.

2. An electromagnetic linear motion device as set forth in claim 1, in which said bearings are grooved rollers which are in rolling contact with said guiding rods through their circumferential grooves.

3. An electromagnetic linear motion device as set forth in claim 1, in which said guiding rods are bored throughout their lenghts.

4. An electromagnetic linear motion device as set forth in claim 3, in which said control coil is led out of said device through at least one of the bored guiding rods.

5. An electromagnetic linear motion device as set forth in claim 1, in which said magnet means comprises a first pair of permanent magnet elements which are positioned between facing end portions of said inner and outer pole pieces and a second pair of permanent magnet elements which are positioned between the other end portions of said inner and outer pole pieces.

6. An electromagnetic linear motion device as set forth in claim 5, in which said outer pole piece consists of a pair of outer pole piece elements extending at spacings from and substantially in parallel to both sides of said inner pole piece.

7. An electromagnetic linear motion device as set forth in claim 1, in which said bearings are rotatably received in slots which are formed in said outer pole piece.

8. An electromagnetic linear motion device as set forth in claim 1, in which said bearings are rotatably received in recesses which are formed in an outer peripheral wall of said inner pole piece.

9. An electromagnetic linear motion device as set forth in claim 1, in which said spring is secured at one end to said movable core and at the other end to a member which is stationary 10. An electromagnetic linear motion device as set forth in claim 1, in which said resilient suspension means comprises a pair of springs, one of which is mounted between one end of said movable core and an end wall of a stationary member positioned opposite said outer pole piece and the other of which is mounted between the other end of said movable core 10. An electromagnetic linear motion device as set forth in claim 1, in which said resilient suspension means comprises a pair of springs, one of which is mounted between one end of said movable core and an end wall of a stationary member positioned opposite said outer pole piece and the other of which is mounted between the other end of said movable core and an end wall of said outer pole piece.

11. An electromagnetic linear motion device as set forth in claim 1, in which said resilient suspension means comprises a plurality of connecting rods extending from opposite ends of said movable core and projecting outwardly through both ends of said inner and outer pole pieces, a pair of end plates each connected to leading ends of said connecting rods, and a pair of springs each seated at one end on an outer face of each of said end plates and at the other end on stationary means which is stationary relative to said inner and outer pole pieces.

12. An electromagnetic linear motion device as set forth in claim 11, in which said connecting rods, said end plates, and said springs are made of an electrically conductive material and are electrically connected to said control coil.

13. An electromagnetic linear motion device as set forth in claim 11, in which said stationary means comprises adjusting bolt and nut for varying a prestress in each of said springs.

14. An electromagnetic linear motion device as set forth in claim 1, in which said magnet means comprises a permanent magnet.

15. An electromagnetic linear motion device as set forth in claim 14, in which said permanent magnet is positioned internally of said outer pole piece and substantially in line with said inner pole piece.

16. An electromagnetic linear motion device as set forth in claim 1, in which said magnet means comprises at least one magnetizing coil wrapped around said inner pole piece and located relative to said movable core, the magnetizing and control coils being wound in the same direction.

17. An electromagnetic linear motion device as set forth in claim 16, in which at least two magnetizing coils are wrapped around said inner pole piece, said magnetizing coils being connected in series with said control coil.

18. An electromagnetic linear motion device as set forth in claim 16, in which at least two magnetizing coils are wrapped around said inner pole piece, said magnetizing coils being connected in parallel to said control coil.

19. An electromagnetic linear motion device as set forth in claim 18, in which said magnetizing coils are connected in parallel to each other.

20. An electromagnetic linear motion device as set forth in claim 16, in which said magnetic means further comprises a rheostat which is connected in series with said control coil.

21. An electromagnetic linear motion device as set forth in claim 1, in which at least two control coils are wrapped around said movable core, said control coils being associated with respective brushes leading to conductors.

* * * * *